April 18, 1967 J. J. AMODEI 3,315,100

ELECTRICAL CIRCUITS USING NEGATIVE RESISTANCE DIODE-TRANSISTOR COMBINATION

Original Filed Aug. 22, 1960 3 Sheets-Sheet 1

INVENTOR.
JUAN J. AMODEI
BY John V. Regan
Attorney

INVENTOR.
JUAN J. AMODEI
BY John V. Regan
ATTORNEY

INVENTOR.
JUAN J. AMODEI
BY John V. Regan
ATTORNEY 3,315,100

ELECTRICAL CIRCUITS USING NEGATIVE RESISTANCE DIODE-TRANSISTOR COMBINATION

Juan J. Amodei, Levittown, Pa., assignor to Radio Corporation of America, a corporation of Delaware Continuation of applications Ser. No. 50,946, Aug. 22, 1960, Ser. No. 59,919, Oct. 3, 1960, and Ser. No. 265,016, Mar. 11, 1963. This application Nov. 19, 1964, Ser. No. 414,502
35 Claims. (Cl. 307—88.5)

This invention relates to electrical circuits and, in particular, to circuits useful in a digital information handling system.

This application is a continuation of application, Ser. No. 59,919, filed Oct. 3, 1960, and application, Ser. No. 265,016, filed Mar. 11, 1963, both now abandoned the latter application being a continuation of my abandoned application, Ser. No. 50,946, filed Aug. 22, 1960.

Among the various operations performed in a digital computer, for example, are logical gating, addition, switching and storage of information signals. These various operations may be carried out by employing arrangements of one or more elemental circuits each of similar type. In its broader aspects, the present invention relates to circuitry suitable for use as an elemental circuit in a system performing these operations.

It is an object of this invention to provide a new and improved pulse circuit.

It is another object of this invention to provide a new and improved pulse circuit suitable for use as an elemental circuit in a digital information system.

It is still another object of this invention to provide an improved pulse circuit which includes the combination of a negative resistance diode and a transistor.

It is yet another object of this invention to provide an improved pulse circuit which provides two simultaneous outputs of opposite sense in response to an input pulse or pulses of prescribed characteristics.

A further object of this invention is to provide an improved half adder circuit employing a negative resistance diode-transistor combination.

These and other objects of the invention are accomplished by the combination of a two-terminal negative resistance active device; a positive resistance, active element connected in parallel with said device; an impedance element having one end connected to one of the terminals of said devices; and means connected to the other of said terminals for receiving an energizing signal for biasing said device. In one embodiment of the invention, the positive resistance, active element is a transistor having its emitter-base junction connected in shunt with the negative resistance device, and the impedance element is a second transistor.

Figure 5:
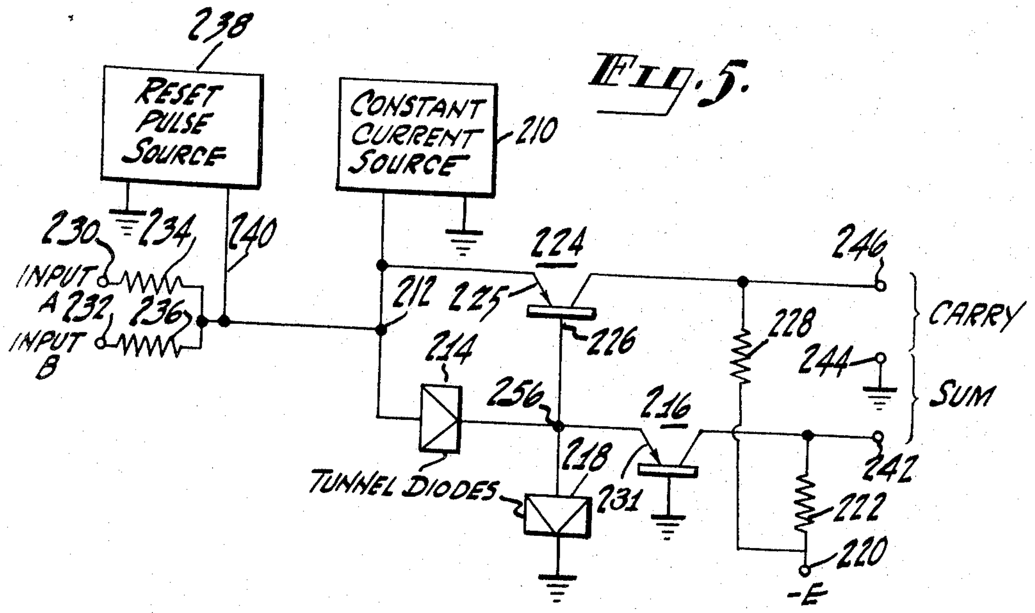
FIGURE 5 is a schematic diagram of another embodiment of the invention having particular application as a half adder.
Figure 6:
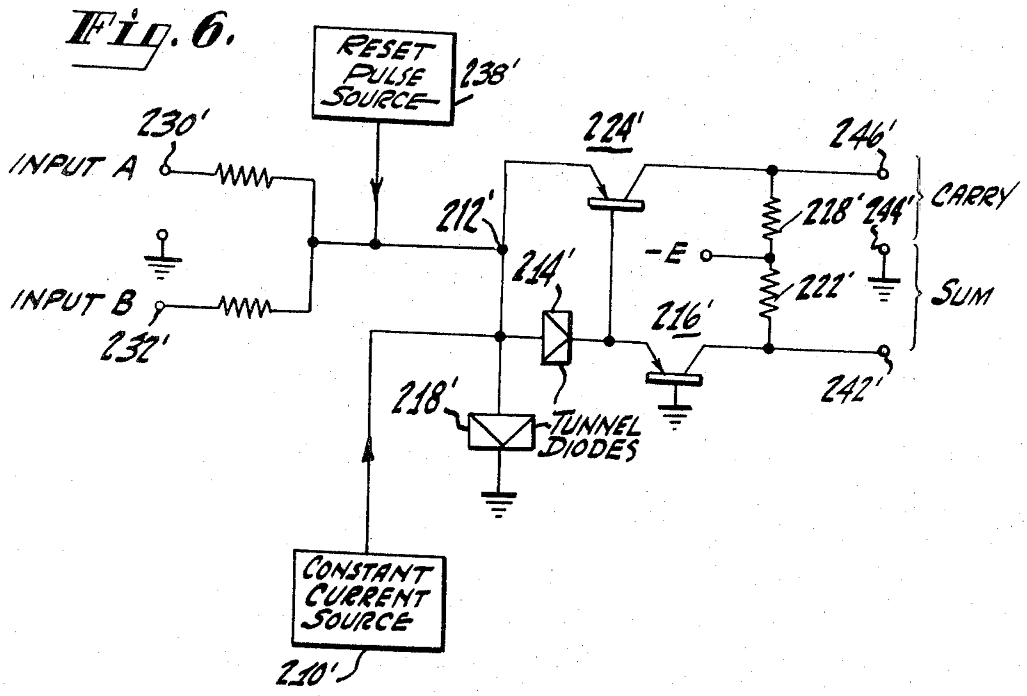
FIGURE 6 is a schematic diagram of still another embodiment of the invention useful as a half adder.
Figure 7:
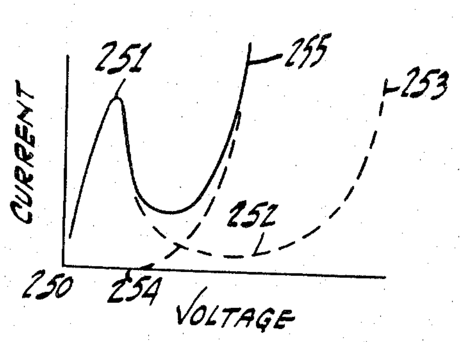
Figure 8:
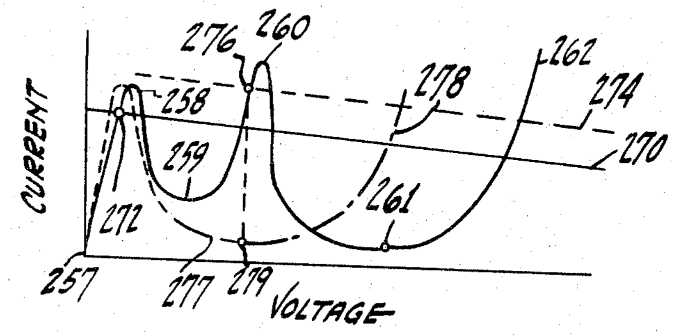
Figure 9:
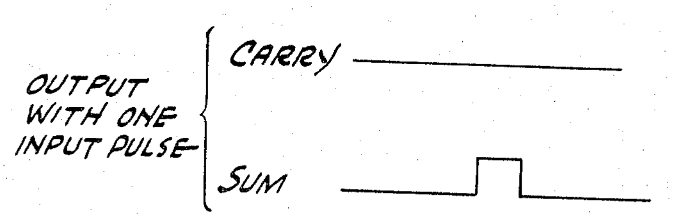
Figure 10:
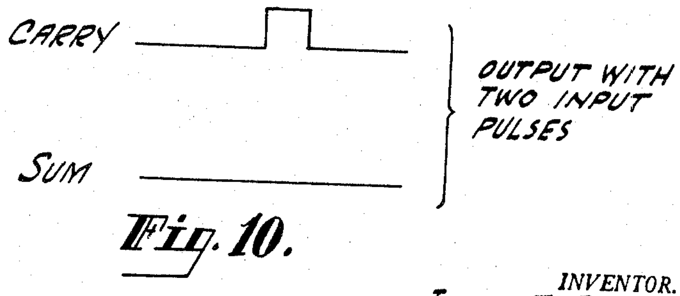

FIGURES 7 and 8 are characteristics of current versus voltage useful in explaining the operation of the circuit of FIGURE 5; and FIGURES 9 and 10 are drawings of waveforms present in the circuits of FIGURES 5 and 6 under various conditions.

Figure 1:
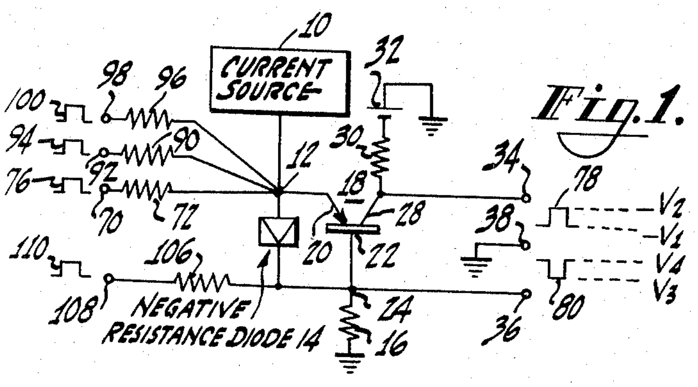
FIGURE 1 is a schematic diagram of one form of the invention wherein an impedance element is connected in series with the negative resistance diode.

In FIGURE 1, current source 10 supplies an operating current to a junction point 12. This current may be a positive direct current of constant magnitude, or positive pulses of current of equal magnitude which occur at timed intervals. In the former case, the source 10 may comprise a battery having its negative terminal connected to a point of reference potential, such as circuit ground, and having its positive terminal coupled to the junction point 12 through a resistor of sufficiently large value to provide a constant current. In the case of current pulses, the source 10 may comprise the series combination of a resistor of large value and the secondary of a current pulse transformer.

A negative resistance diode 14 has one terminal connected to the junction point 12 and the other terminal connected to one end of an impedance element, illustrated as a resistor 16. The other end of the resistor is connected to reference ground. The emitter-base diode of a PNP junction transistor 18 is connected in parallel with the negative resistance diode 14. The emitter electrode 20 is connected to the junction point 12 and the base electrode 22 is connected to a junction point 24 between the lower terminal of the negative resistance diode 14 and the ungrounded end of the resistor 16.

The polarity of the current source 10 is such that positive current, in the conventional sense, flows from the source 10 to the junction point 12. The diode 14 is poled in the forward direction between the junction points 12 and 24. The negative resistance diode 14 is one whose volt-ampere characteristic has two distinct regions of positive resistance separated by a region of negative resistance. One type of diode possessing such a characteristic and suitable for use in practicing the invention is a tunnel diode. When the negative resistance diode 14 is a tunnel diode, the anode thereof is connected to the junction point 12 and the cathode is connected to the junction point 24.

The collector electrode 28 of the transistor 18 is connected through a load resistor 30 to the negative terminal of a biasing source, illustrated as a battery 32. The positive terminal of the battery 32 is connected to ground, whereby the collector is biased in the reverse direction with respect to the common base 22. A first output terminal 34 is connected directly to the collector electrode 28. A second output terminal 36 is connected to the junction point 24. Output signals may be derived between either or both of these electrodes 34, 36 and ground. A common, grounded output terminal for this purpose is indicated by reference character 38.

Operation of the FIGURE 1 circuit may best be described with reference to the characteristic curves of FIGURE 2. The volt- ampere characteristic of a tunnel diode 14 is illustrated by the curve 44. This curve, as may be seen in FIGURE 2, has two positive resistance regions 46, 48 and 50, 52 separated by a region 48, 50 of negative resistance. The dot-dash curve 56 is the volt-ampere characteristic of the transistor 18 looking between the emitter electrode 20 and the base electrode 22. Inasmuch as the tunnel diode 14 is connected in parallel with the emitter-base diode of the transistor 18, the same voltage must appear across both. A composite characteristic may then be drawn by adding the tunnel diode 14 and emitter 20 currents at the same voltage. The composite characteristic curve 58 comprises the solid curve portion 46, 48, 59 and the dashed curve portion 59, 61.

The substantially horizontal load line 60 intersects the combined characteristic 58 at points 62, 64, 66. The points 62, 66 of intersection with the positive resistance portions 46, 48 and 59, 61 of the combined characteristic 58 are points of stable operation. The point 64 of intersection in the negative resistance region 48, 59 is an unstable operating point. When the circuit is initially energized by a current $Ia$ from the current source 10, operation of the tunnel diode 14 stabilizes at the point 62 of low voltage and high current. The voltage across the tunnel diode 14 then may be approximately 40 millivolts, depending upon the particular tunnel diode. No current flows into the emitter electrode 20 at this time because the voltage across the emitter-base diode is insufficient to provide the necessary forward bias for transistor 18 conduction.

The tunnel diode 14 may be switched to the high voltage, low current state by increasing the current through the tunnel diode an amount sufficient to raise the load line above the peak 48 of the characteristic curve. Assume that the current is increased an amount $\Delta I$. The load line under these conditions is indicated by the dash-dot line 70. As may be seen in FIGURE 2, this load line 70 has no point of intersection with the positive resistance region 46, 48 of the composite characteristic. The tunnel diode 14 therefor switches rapidly through the negative resistance region, and the voltage across the tunnel diode 14 increases. Switching may occur along the load line 70 to the point 80 of intersection with the composite curve 58. If the current is now reduced to its preswitching value, $Ia$, the circuit stabilizes at the point 66 of intersection of the load line 60 and the characteristic curve 58.

The voltage corresponding to point 66 may be for example 250 millivolts, a value sufficient to bias the transistor 18 into conduction. The current flowing into the emitter electrode 20 and the current flowing into the tunnel diode 14 at this time may be determined from the characteristic curves 56, 44, respectively. A constant voltage line (dotted vertical line 82) through the operating point 66 intersects the curves 56 and 44 at points 84 and 86, respectively. The decrease in current through the tunnel diode 14 after the diode 14 has been switched to the operating point 66 is $Ia-Ib$. Most of the current $Ic$ flowing into the emitter electrode 20 reaches the collector electrode 28 and flows through the collector load resistor 30. Only a small portion of the emitter current $Ic$, approximately $Ic/B$, flows to the base electrode 22, where B is the beta of the transistor 18. This latter current generally may be neglected.

The voltage at the collector electrode 28 rises (becomes less negative) an amount approximately equal to the product $I_cR_{30}$ as a result of the switching aforementioned, where $R_{30}$ is the resistance of the collector load resistor 30. At the same time, the voltage at the junction point 24 decreases an amount approximately equal to the product $(Ia-Ib)\ R_{16}$ where $R_{16}$ is the resistance of the external base resistor 16. Consequently, the outputs derived between the output terminals 34, 36 and ground are of opposite polarity. The magnitudes of these outputs may be made equal by properly selecting the values of the external collector and base resistors 30 and 16, respectively. The value of the base resistor 16 usually is selected in accordance with other criteria, as will be described more fully hereinafter. Three millimicrosecond switching with current gain has been observed in the FIGURE 1 circuit. The low input impedance of the transistor 18 provides a suitable load for very high switching efficiency of the tunnel diode 14.

The tunnel diode 14 may be switched back to the low voltage state of high current by reducing the current through the tunnel diode 14 to a value less than that corresponding to the valley 50 of the diode characteristic 44. Such switching is automatic in the case of current pulses supplied by the source 10. Switching also may be accomplished by reset pulses (FIGURES 3 and 4) if a constant current is supplied by the source 10. Another method of switching will be described hereinafter. The particular switching method employed in any application is determined generally by the function to be performed by the circuit.

Consider now the operation of the circuit functioning as both an amplifier and an inverter of input pulses. Such a circuit is useful in a digital system, for example, where binary "one" (or "zero") is represented by a positive pulse and a binary "zero" (or "one") is represented by a negative pulse or by the absence of a pulse. Amplification, in the present sense, means a large output signal in response to a small input signal, and should not be confused with linear amplification.

A resistor 72 is connected between the junction point 12 and an input terminal 74. Input pulses 76 to be amplified and inverted are applied between the input terminal 74 and reference ground. Such input pulses generally occur during fixed time intervals in the case of a synchronous system. Current pulses of magnitude $Ia$ may be applied to junction point 12 during these time intervals from the source 10. Alternatively, the source 10 may supply a constant current of amplitude $Ia$, and reset pulses may be applied to the terminal 12 (see FIGURES 3 and 4 following the time intervals aforesaid. The positive input pulses 76 have an amplitude sufficent to switch the tunnel diode 14 from the low voltage state to the high voltage state.

In the absence of an input pulse 76, the tunnel diode 14 stabilizes at the operating point 62 (FIGURE 2) when energized from the current source 10. All of the current from the source 10 flows into the tunnel diode 14 and through the external base resistor 16. The voltage at the output electrode 36 then is relatively high and is positive with respect to ground. The voltage at the other output electrode 34 is highly negative and has a value approximately equal to the value of the battery voltage 32. The voltage at the output terminal 34 remains unchanged and the voltage at the output terminal 36 is decreased only a slight amount during the presence of a negative input pulse at the input terminal 74.

The tunnel diode 14 switches to the high voltage, low current state in response to a positive input pulse 76 supplying current $\Delta I$, assuming, of course, that the circuit is then energized from the current source 10. The hybrid circuit stabilizes at the operating point 80 for the duration of the positive input pulse 76, and may stabilize thereafter at operating point 66 if the circuit is not reset immediately. In either event, substantial current flows into the emitter electrode 20, producing a positive going output pulse 78 at the output terminal 34. The voltage at the junction point 24 is reduced at this time because of the reduced current flow through the resistor 16. A negative pulse 79 is derived at the output terminal 36. A positive output pulse 78 represents a binary "one" and a negative output pulse 79 represents a binary "zero" in a system wherein a positive input pulse 76 represents a binary "one." Viewed in another way, voltage $-V_2$ at output terminal 34 represents a binary "one," and a voltage $-V_1$ at this terminal 34 represents a binary "zero." Voltages $V_4$ and $V_3$ at output terminal 36 represent a binary "one" and a binary "zero," respectively. It is thus seen that signal inversion is obtained at the output terminal 36. It is often desirable to select the value of the base resistor 16 to minimize the voltage change between the emitter electrode 20 and ground due to switching. A resistor 16 having a value approximately equal to the positive resistance of the tunnel diode 14 is satisfactory for this purpose.

The FIGURE 1 circuit also may perform the logical operations of "or," "and" and majority logic. A second resistor 90 may be connected between the junction point 12 and a second input terminal 92. Input pulses 94 from a second input source may be applied at the second terminal 92. Assume that a binary "one" is represented by a positive input pulse 76 or 94, and a binary "zero" is represented by the absence of a pluse.

The input pulses 76, 94 area adjusted in amplitude so that either pulse alone is sufficient to switch the tunnel diode 14 to the high voltage state of low current. A positive going output pulse 78 is obtained at the output terminal 34 in response to the presence of either or both of the input pulses 76, 94. The circuit thus performs the logical "or" function, and the output at the terminal 34 is the output of the "or" gate. The voltage at the junction point 24 is highly positive, relatively speaking, in the absence of both of the input pulses 76, 94, and goes low in response to either or both of these input pulses. The circuit thus performs also the logical "nor" function, the output of the "nor" circuit being derived at the output terminal 36.

A three input "or" gate and "nor" gate may be provided by connecting a third resistor 96 between the junction point 12 and a third input terminal 98. Input pulses 100 from a third input source may be applied at the input terminal 98. The magnitudes of the input pulses 76, 94 and 100 are such that any one of the pulses alone is sufficient to switch the tunnel diode 14 from the low voltage, high current state to the high voltage, low current state. It will be understood that the circuit may be extended to an "N" input gate by adding other input resistors and input terminals. The "truth table" and a two-input "or," and for a two-input "nor" gate is as follows, wherein the column headings represent the various input and output terminals of the circuit:

| 74 | 92 | ("Or") 34 | ("Nor") 36 |
|---|---|---|---|
| 0 | 0 | 0 | 1 |
| 1 | 0 | 1 | 0 |
| 0 | 1 | 1 | 0 |
| 1 | 1 | 1 | 0 |

The FIGURE 1 circuit may be operated as a two input "and" gate by properly adjusting either the amplitudes of the input pulses 76, 94 or the magnitude of the current supplied by the source 10. In either event, switching of the tunnel diode 14 from the low voltage, high current state to the high voltage, low current state should occur only in response to input pulses 76, 94 applied concurrently at the input terminals 74, 92, respectively. No switching should take place in response to either input pulse 76, 94 alone. The input terminal 98 is not used at this time. A positive going pulse may represent a binary "one" and a negative pulse may represent a binary "zero." A binary "zero" may also be represented by the absence of a pulse.

Figure 2:
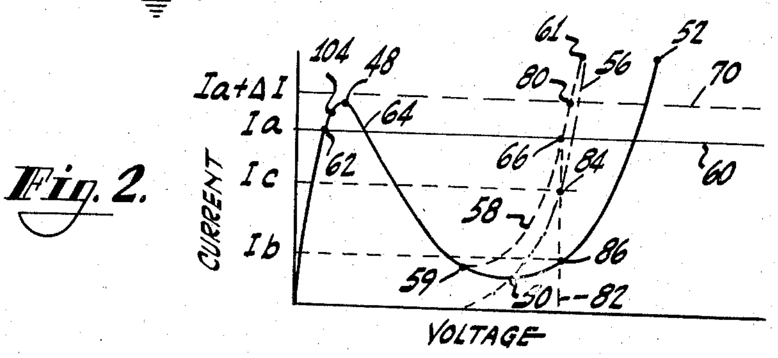
FIGURE 2 is a set of current-versus-voltage characteristics useful in explaining the operation of the FIGURE 1 circuit.

Assuming that current source 10 supplies a current $Ia$, either continuously or in pulse form, to the junction point 12, the load line for the tunnel diode 14-transistor 18 combination is represented by the solid line 60 in FIGURE 2. The input pulses may be adjusted so that one input pulse 76 or 94 alone raises the current through the tunnel diode 14 an amount $\Delta I/2$ to a value corresponding to the point 104 in the positive resistance region 46, 48 of FIGURE 2. No switching occurs in response to this pulse. The current delivered to the junction point 12 may have a value $Ia+\Delta I$ when both input pulses 76, 94 are applied concurrently. This value of current exceeds the peak current of the tunnel diode 14 in the low voltage state, whereupon the tunnel diode 14 switches rapidly through the negative resistance region to a stable point of high voltage and low current. By "applied concurrently" is meant that at least a portion of the input pulses 76, 94 are present during the same time interval. If the source 10 supplies pulses of current, the above-mentioned time interval must occur during the duration of a current pulse.

The transistor 18 conducts when the tunnel diode 14 is switched from the low voltage state to the high voltage state, and the voltage at the collector electrode 28 rises (becomes less negative). However, the current through the tunnel diode 14 decreases an amount equal to the emitter 20 current increase. A decrease in voltage is experienced at the junction point 24 as a result of the decrease in tunnel diode 14 current. The tunnel diode 14 may then be switched back to the low voltage state by any of the methods aforesaid.

An "N" input "and" gate may be provided by adding the proper number of input terminals. In the case of a three-input "and" gate, input signals 100 from a third source are applied at a third input terminal 98. The amplitudes of the input pulses 76, 94, 100 are adjusted so that all three input pulses must be present simultaneously to effect switching of the tunnel diode 14 from the low voltage state to the high voltage state. The output of the "and" gate is derived at the output terminal 34. A positive output pulse 78 occurs when all input pulses are present at the same time. Because the output at the other output terminal 36 is of opposite sense, the FIGURE 1 circuit also functions as a "nand" gate. The truth table for the FIGURE 1 circuit functioning as a two-input "and" gate and for a two-input "nand" gate is as follows, where the column headings correspond to the various input and output terminals:

| 74 | 92 | ("And") 34 | ("Nand") 36 |
|---|---|---|---|
| 0 | 0 | 0 | 1 |
| 1 | 0 | 0 | 1 |
| 0 | 1 | 0 | 1 |
| 1 | 1 | 1 | 0 |

It is believed apparent from the foregoing that the FIGURE 1 circuit also may be used as a "majority" gate. A "majority" gate may be defined as a gate having a plurality of inputs and an output, wherein an output of prescribed character is obtained only when a majority of the inputs are properly energized. In the FIGURE 1 circuit, for example, the input pulses 76, 94 and 100 may be adjusted in amplitude so that the tunnel diode 14 is switched to the high voltage state whenever two or more of the inputs are positive going pulses. A positive going output pulse 78 is then obtained at the output terminal 34.

The FIGURE 1 circuit also may be operated as a bistable multivibrator having set and reset input terminals. The terminal 74 may be used as the set input terminal. The other input terminals 92 and 98 connected to the junction point 12 then are not used. A resistor 106 is connected between the junction point 24 and a reset terminal 108. Set and reset input pulses 76 and 110 are applied at the set and reset terminals 74 and 108, respectively. The current source 10 is a source of continuous and constant direct current.

The tunnel diode 14 stabilizes at the operating point 62 when energized initially from the current source 10. The voltage at the output electrode 34 is highly negative at this time, and the voltage at the other output electrode 36 is highly positive, relatively speaking. A reset pulse 110 applied at this time decreases the current through the tunnel diode 14 for the duration of the pulse, but does not switch the tunnel diode 14 to the high voltage state.

The set pulse 76 has an amplitude sufficient to switch the diode 14 from the low voltage state to the high voltage state. If this pulse 76 is applied when the tunnel diode 14 is in the low voltage state, the multivibrator changes state. The voltage at the output terminal 34 then rises (becomes less negative) and the voltage at the other output terminal 34 decreases (becomes less positive). The reset pulse 110 has an amplitude sufficient to decrease the current through the tunnel diode 14 below the valley of the characteristic 44, whereby the tunnel diode 14 is switched from the high to the low voltage stable state. It is desirable in the case of the multivibrator to adjust the source 10 current so as to obtain set and reset with pulses 76, 110 of approximately the same amplitude.

Figure 3:
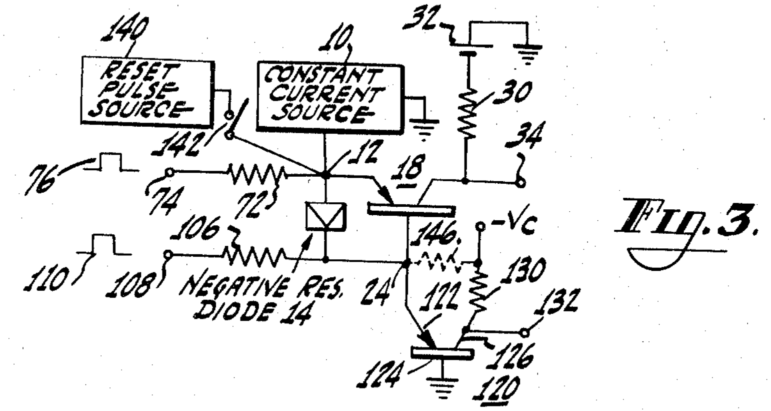
FIGURE 3 is a schematic circuit diagram of another form of the invention wherein the negative resistance diode is connected in parallel with the emitter-base diode of a first transistor and in series with the emitter-base diode of a second transistor.

Another embodiment of the invention is illustrated schematically in FIGURE 3. A grounded base transistor 120, for example a PNP junction transistor, is connected between the junction point 24 and ground. The emitter electrode 122 of this transistor 120 is connected directly to the junction point 24 and the base electrode 124 is grounded. The collector electrode 126 is connected by way of a load resistor 130 to a source, of bias, designated $-V_c$. This bias source may be a battery (not shown). The tunnel diode 14 is connected in parallel with the emitter-base diode of transistor 18 and in series with the emitter-base diode of transistor 120.

A reset pulse source 140 has one terminal grounded, and has a second terminal connected to the junction point 12 through a switch 142. The switch 142 is illustrative only to indicate that the reset pulse source 140 may or may not be connected to the circuit, depending upon the particular function being performed by the circuit. The FIGURE 3 circuit can perform all of the functions previously described in connection with the FIGURE 1 circuit. For this reason, only a few specific examples will be given to explain the operation of the FIGURE 3 circuit.

Consider now the basic operation of the FIGURE 3 circuit. The current source 10 supplies a constant, positive current $Ia$ to the junction point 12. The reset source 140, when connected, supplies negative current pulses to the same junction point 12. These pulses may be applied periodically or aperiodically, depending on the circuit's application. In either case, the amplitude of these pulses is such that the pulses can switch the tunnel diode 14 from the high voltage state to the low voltage state.

The tunnel diode stabilizes in the low voltage state of high current when it is energized initially by the current source 10. Substantially all of the source 10 current then flows through the tunnel diode 14 and into the emitter electrode 122 of the transistor 120. Almost all of this current flows through the collector load resistor 130, and the voltage at the output terminal 132 may then be only slightly negative. Since little or no current flows through the collector resistor 30 of the other transistor 18, the voltage at the output electrode 34 is then highly negative, and approximately equal to the value of the battery 32.

The tunnel diode 14 may be switched to the high voltage state by increasing the current through the diode 14 to a value exceeding the peak current of the diode 14 in the low voltage state. The current may be increased, for example, by an input pulse 76 applied at input terminal 74. The tunnel diode then switches to the high voltage state of low current. The current flow through the tunnel diode 14 and into the emitter of the transistor 120 is reduced sharply. Consequently, the voltage at the output terminal 132 decreases (goes highly negative). At the same time, however, a large current flows into the emitter of the transistor 18. Most of this current reaches the collector and flows through the collector load resistor 30. A voltage swing in the positive direction is experienced at the output terminal 34.

The tunnel diode 14 may be switched back to the low voltage, high current state by decreasing temporarily the current through the diode a sufficient amount. This may be accomplished, for example, by a negative reset pulse from the reset source 140, or by a positive pulse 110 applied at input terminal 108. It is to be noted that the outputs at output terminals 34 and 132 are of opposite sense. Also, a larger output may be derived at output terminal 132 of FIGURE 3 than at output terminal 34 of FIGURE 1 because of the power gain provided by the transistor 120.

The voltage range of the outputs may be equalized by properly selecting the values of the collector load resistors 30, 130 and collector biasing sources. In some cases it may be desired that the transistor 120 not conduct when the tunnel diode is in the high voltage state. This may be achieved by connecting a resistor 146 between the junction point 24 and the collector 126 bias source, $-V_c$. The value of the resistor 146 should be equal to $V_c$ volts divided by the tunnel diode 14 current in the stable high voltage, low current state. Of course, the current through the resistor 120 when the tunnel diode is in the low voltage state then is also reduced.

The FIGURE 3 circuit may be operated as a combined amplifier and inverter by applying positive pulses 76 at the input terminal 74. Input terminal 108 then is disconnected. Switch 142 is closed to allow resetting of the circuit by pulses from the reset source 140. The circuit may be operated as a multivibrator in the manner described previously by opening switch 142 and applying positive pulses 76, 110 alternately at input terminals 74, 108, respectively.

Figure 4:
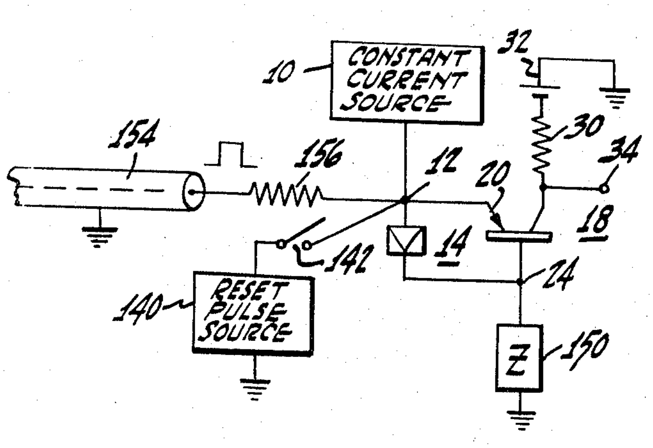
FIGURE 4 is a schematic circuit diagram of an embodiment of the invention wherein information signals are applied to the circuit by way of a transmission line.

An embodiment of the invention suitable for use with transmission lines at high frequencies is illustrated schematically in FIGURE 4. The components in FIGURE 4 which are similar to components in FIGURES 1 and 3 are designated by like reference characters and will not be described further.

One of the problems encountered in high speed computers is the proper termination of low impedance transmission lines without wasting a large portion of the available signal current. An impedance element 150 is connected between the junction point 24 and ground in FIGURE 4. This element 150 may be a resistor, for example, which has a low value of impedance, approximately equal to the average negative resistance of the tunnel diode 14.

The voltage drop across this element 150 during switching then offsets, or counterbalances, the voltage rise across the tunnel diode 14. A transmission line 154 feeding the current then can be terminated in its characteristic impedance by a resistor 156 since the circuit between junction point 12 and reference ground will appear to have no impedance during the switching transient. Moreover, the change in voltage between the emitter electode 20 and ground is minimized during switching time by an impedance element 150 of the character aforementioned. A large voltage voltage reflection back through the transmission line 154 is thereby prevented.

The negative resistance of the tunnel diode 14 is not constant throughout the negative resistance region 48–50 (FIGURE 2). For this reason, the impedance match provided by an element 150 of fixed resistance, though suitable in most applications, is not a perfect one throughout the entire region. A better match may be obtained if the impedance element 150 has a non-linear volt-ampere characteristic. In particular, the characteristic should be substantially a positive image of the negative resistance portion 48, 50 of the tunnel diode 14 volt-ampere characteristic 44. A germainium diode and certain transistors have nonlinear characteristics which approach closely the desired shape. It is to be understood, therefore, that the impedance element 150 may be a germanium diode or other element having such a nonlinear characteristic.

Although the positive resistance, active device has been illustrated in the drawing as a PNP transistor 18, it will be apparent to those skilled in the art that an NPN transistor also may be used. It is necessary in that event, of course, to reverse the polarities of the various bias sources and input pulses. Connections to the tunnel diode also must be reversed.

In the embodiment of FIGURE 5, a constant current source 210 supplies an operating current to common circuit terminal 212. This current may be a positive direct current or positive current pulses which occur in coincidence with the information input pulses. A number of circuits in parallel are connected to the common terminal 212. The first branch circuit includes a tunnel diode 214 in series in the forward direction with the emitter-to-collector path of a PNP transistor 216. A second tunnel diode 218 is connected in the forward direction in shunt across the emitter-to-base diode of transistor 216. The second tunnel diode is of a somewhat lower current peak value than tunnel diode 214. Operating voltage −E for the transistor is applied from terminal 220 through resistor 222 to the collector of the transistor.

A second branch circuit connected to terminal 212 includes a second PNP transistor 224. The emitter 225-to-base 226 diode of this transistor is connected across tunnel diode 214. Operating voltage for transistor 224 is applied from terminal 220 through resistor 228 to the collector of the transistor.

The circuit of FIGURE 5 is useful as a half adder. Input pulses indicative of binary digits are applied to input terminals 230 and 232. These terminals are connected through coupling resistors 234 and 236 to the common input terminal 212. A positive input current pulse represents the binary digit "one." No pulse represents the binary digit "zero." The output signals of the adder are sum and carry currents. The sum current is available between terminals 242 and 244 and the carry current is available between terminals 246 and 244. The presence of a current is indicative of the binary digit "one" and the absence of a current is indicative of the binary digit "zero."

The reset circuit for the adder is shown as block 238. It applies a negative pulse via lead 240 to common terminal 212.

The truth table for a half adder in which A and B are the addend and augend quantities and S and C the sum and carry quantities, is as follows:

| A | B | S | C |
|---|---|---|---|
| 0 | 0 | 0 | 0 |
| 0 | 1 | 1 | 0 |
| 1 | 0 | 1 | 0 |
| 1 | 1 | 0 | 1 |

The way in which the circuit of FIGURE 5 implements this truth table may be better understood by consideration of the voltage versus current characteristics for the circuits as shown in FIGURES 7 and 8.

Referring first to FIGURES 5 and 7, it may be observed that tunnel diode 218 is connected in shunt across the emitter-to-base diode of transistor 216. The characteristic for the tunnel diode alone is shown at 250, 251, 252, 253 in FIGURE 7. Classically, this general type of negative resistance element, that is, one in which one of two stable voltages may be obtained in response to a given input current, is known as a "voltage controlled" negative resistance element. The characteristic for the transistor alone looking into the emitter 231 is as shown at 254, 255. Since these two circuit elements are in parallel, the voltage across them is the same at all times but the current through them is the sum of the currents in the two branches. Accordingly, to obtain the composite characteristic of the tunnel diode 218 in shunt with the emitter-to-base diode of transistor 216 looking into circuit terminal 256, the two characteristics are added in the direction of the current axis. The composite characteristic is shown by solid line 250, 251, 255.

Tunnel diode 214 is connected in series with the shunt circuit just described. Accordingly, to obtain the composite characteristic looking from terminal 212 into the circuit branch containing tunnel diode 214, the characteristic of FIGURE 7 is added to the characteristic of the tunnel diode 214 in the direction of the voltage axis. When this is done, the characteristic shown at 257, 258, 259, 260, 261, 262 in FIGURE 8 is obtained. This characteristic is substantially correct for no input pulses to the circuit or one input pulse to the circuit since, under these conditions, the loading of the circuit by transistor 224, which does not conduct, may be ignored. However, when there are two input pulses A and B to the circuit, transistor 224 begins to conduct heavily and the composite characteristic is changed. This is not shown in FIGURE 8 in view of the complex interaction involved. Instead the circuit operation is described in detail later for the case of two input pulses.

The resistors 234 and 236 through which the input pulses are applied are of relatively large value compared, for example, to the positive resistance of a tunnel diode. The load line for these resistors may be as represented by solid line 270.

With no input pulses applied to input terminals 230, 232, the current from source 210 applied to common terminal 212 flows substantially entirely into the circuit branch containing tunnel diode 214. The circuit operating point is at 272 in FIGURE 8. At this operating point, tunnel diode 218 is in the high current region of the low voltage state. Tunnel diode 214 draws substantially the same amount of current as tunnel diode 218 and it also is in the low voltage state. The voltage across tunnel diode 214 is insufficient to turn transistor 224 "on." Therefore, this transistor conducts substantially no current and a binary "zero" appears at carry terminal 246. The voltage across tunnel diode 218 is insufficient to turn the transistor 216 "on." Therefore, this transistor conducts substantially no current either, and a binary "zero" appears at sum terminal 242.

Put slightly differently, the current flowing through tunnel diode 214 may be thought of as having two possible branches into which to flow, one including tunnel diode 218 and the other including the emitter circuit of transistor 216. When tunnel diode 218 is in a low voltage state, it steers substantially this entire current into the tunnel diode and none of it flows into the transistor.

When one input pulse (one binary "one") is applied to one of the terminals, the load line 270 for the circuit shifts in the upward direction as is indicated at 274. As previously mentioned, tunnel diode 218 has a lower current peak than tunnel diode 214. As may be seen from FIGURE 8, when the load line shifts to position 274, there is no longer a stable intersection between the low voltage state of tunnel diode 218 and the load line. Accordingly, the circuit operating point shifts to 276. At this operating point, tunnel diode 218 is in the low current region of its high voltage state.

Reviewing for a moment, tunnel diode 214 is drawing relatively high current in the low voltage state. Tunnel diode 218 is drawing relatively low current and is in the high voltage state. When tunnel diode 218 is in the high voltage state, the voltage across it, which is of the order of 350 millivolts or so, depending upon the particular tunnel diode employed, is sufficient substantially to forward bias the emitter-to-base diode of transistor 216. Accordingly, this transistor is turned "on" and substantially all of the input current passes into the transistor and appears as a sum output signal representative of the binary digit "one" at sum terminal 242.

During the operation just described, tunnel diode 214 was stated to be in its low voltage state. This tunnel diode is connected across the emitter-to-base diode of transistor 224. The voltage across the emitter-to-base diode of transistor 224, accordingly, may be 30 or 40 millivolts or so, a value insufficient to cause the transistor to conduct. Accordingly, an output signal representative of the binary digit "zero" (no output current) appears at carry terminal 246.

When input pulses A and B are applied to input terminals 230 and 232, it is found that tunnel diode 214 switches to the low current region of the high voltage state. The current through tunnel diode 214, when at this operating point, is insufficient to maintain the circuit consisting of tunnel diode 218 in shunt with the emitter-to-base diode of transistor 216 in its high voltage state. In other words, the current is less than the valley current 259 of the characteristic 257, 258, 259, 260. Accordingly, this circuit must switch back to its low voltage state. For this to occur, tunnel diode 218 must switch back to its low voltage state.

Summarizing the operation described immediately above, when two input pulses are applied to this circuit, tunnel diode 214 switches to the low current region of its high voltage state and tunnel diode 218 switches to the low current region of its low voltage state. The low voltage across tunnel diode 218 is insufficient to maintain transistor 216 conducting so that the current available at output terminal 242 becomes "zero." In other words, the sum output is binary binary zero." On the other hand, transistor 214 in its high voltage state forward biases the emitter-to-base diode of transistor 224 sufficiently to turn this transistor "on." The entire input current therefore steers into the circuit branch containing transistor 224 and an output current representative of binary "one" appears at carry terminal 246.

After each half addition operation, it is desirable to reset the circuit. This may be done by applying a negative pulse from source 238 to common input terminal 212.

A circuit according to FIGURE 5 may have the following values of circuit parameters.

Load resistors 222 and 228=560 ohms each
E—=—20 volts
Transistor 216 and 224—Type 2N501
Tunnel diode 218—Germanium having a current peak of about 3.5 milliamperes
Tunnel diode 214—Germanium having a tunnel peak of about 4.7 milliamperes
Resistors 234 and 236—2,400 ohms each The tunnel diodes 214 and 219 noted above each had a voltage at the current peak of about 50 millivolts or so and each had a voltage at the current valley of about 350 millivolts. The values of peak currents specified are not critical but merely happen to be those of two tunnel diodes which were operated in the circuit.

The circuit of FIGURE 6 is quite similar to the one of FIGURE 5 and similar reference numeral primed have been applied to analogous circuit elements. Note, however, that in the circuit of FIGURE 6, tunnel diode 218′ is connected between the anode of tunnel diode 214′ and ground, whereas in the circuit of FIGURE 5, tunnel diode 218 is connected between the emitter 230 of transistor 216 and ground. In the circuit of FIGURE 6, the tunnel diodes 214′ and 218′ may be of the same current peak whereas in the circuit of FIGURE 5, tunnel diode 214 should have a slightly larger current peak than tunnel diode 218. Finally, in the circuit of FIGURE 6, it is preferable, although not essential, that the valley voltage of tunnel diode 218′ be larger than the valley voltage of tunnel diode 214′. For example, tunnel diode 218′ may be a gallium arsenide or silicon tunnel diode and tunnel diode 214′ a germanium tunnel diode. A similar effect can also be achieved by slightly forward biasing the base of transistor 216′.

In operation of the circuit of FIGURE 6, with no input pulses applied, tunnel diode 218′ is in the high current region of its low voltage state and draws substantially the entire input current to the circuit. Accordingly, binary "zeros" appear at output terminals 242′ and 246′.

With one input pulse applied to one of terminals 230′, 232′, tunnel diode 218′ is switched to the low current region of the high voltage state. Tunnel diode 214′ assume a high current in the low voltage state. The voltage across tunnel diode 218′ is sufficient to provide a substantial forward bias between the emitter-to-base diode of transistor 216′. Accordingly, substantially all of the input current flows through tunnel diode 214′ and transistor 216′ and a binary "one" appears at sum output terminal 242′. Substantially no current passes through transistor 224′ since the voltage across its base-to-emitter diode is too low to cause it to conduct. Accordingly, a binary "zero" appears at output terminal 246′.

When input pulses A and B are both applied to the circuit, the input current steers mainly into transistor 224′. Tunnel diodes 214′ and 218′ are switched to the low current region of the high voltage state. Thus, the current flowing into transistor 216′ is low and a binary "zero" appears at sum output terminals 242′, 244′. The increased voltage across tunnel diode 214′ forward biases the emitter-to-base diode of transistor 224′ sufficiently to cause the transistor to conduct substantial current. Thus, a binary "one" appears at carry output terminals 244′, 246′.

It was previously mentioned that tunnel diode 218′ is preferably one with a higher valley voltage than tunnel diode 214′. The voltage across tunnel diode 218′ is equal to the sum of the voltages across tunnel diode 214′ and the emitter-to-base diode of transistor 216′. If tunnel diode 218′ is of higher valley voltage than tunnel diode 214′, when two pulses A and B are applied to the circuit and tunnel diodes 218′ and 214′ switch to the high state, diode 218′ is well down in the valley region and draws very little current. This permits more of the input current to steer into transistor 224′ since less of it is diverted by the shunt path consisting of diode 218′.

Some important advantages of the circuits of FIGURES 5 and 6 include the following. The circuits are simple and reliable and have both voltage and current gain. The sum and carry outputs are standardized at fixed levels. The circuit operation is found to be non-critical as to power supply voltages and other circuit parameters.

A modification of the circuit of FIGURE 6 is possible. In this modification, the base of transistor 224′ is connected to a source of forward bias voltage rather than to the emitter of transistor 216′. In other respects, the circuit is similar to the one of FIGURE 6.

What is claimed is:

1. An electrical circuit comprising: a negative resistance device having two terminals, said device having a volt-ampere characteristic defined by two regions of positive resistance separated by a region of negative resistance; an impedance element having one end connected to one of said terminals; a transistor connected in the common base configuration and having a base connected to said one of said terminals, an emitter connected to the other of said terminals, and a collector; means connected between said other of said terminals and the free end of said impedance element for receiving energization for biasing said device for bistable operation; a load impedance and a biasing means connected between said collector and said free end; and first and second output terminals connected to said collector and said one of said terminals, respectively.

2. An electrical circuit as claimed in claim 1 including means for applying input pulses to one of said two terminals tending to switch said device from one stable state to the other stable state.

3. An electrical circuit as claimed in claim 2 including means for applying input pulses to the other of said two terminals to switch said device from said other stable state to said one stable state.

4. An electrical circuit comprising: a tunnel diode; a first transistor having a base connected to one electrode of said diode, an emitter connected to the other electrode of said diode, and a collector; a second transistor having an emitter connected to said one electrode, a base, and a collector; means for applying potentials to each said collector; and means connected to said base of said second transistor and said other electrode for receiving energization for biasing said tunnel diode for bistable operation.

5. An electrical circuit as claimed in claim 4 including first and second output terminals each connected to a different said collector.

6. An electrical circuit as claimed in claim 4 including means for switching said diode from one stable state to the other stable state.

7. The combination comprising: a diode having a region of negative resistance in its operating characteristic; an output terminal; a device having an output and an input electrode connected, respectively, to said output terminal and to one electrode of said diode, said device also having a control electrode connected to the other electrode of said diode; a point of reference potential; a positive resistance element connected between said other electrode of said diode and said point and having a volt-ampere characteristic which approximates closely the negative image of said diode characteristic in said region; a transmission line having a characteristic impedance; and a resistor connected between said transmission line and said one electrode of said diode, and having a resistance value approximating said characteristic impedance.

8. An electrical circuit comprising: a negative resistance diode having a volt-ampere characteristic defined by two regions of positive resistance separated by a region of negative resistance; a first transistor having a base-emitter diode connected in parallel with said negative resistance diode, and having a collector electrode; a second transistor having an emitter-base diode connected in series with said negative resistance diode, and having a collector; means for applying operating potential to each said collector; and means for applying input signals to said negative resistance diode.

9. An electrical circuit as claimed in claim 8 including first and second output terminals each connected to a different said collector.

10. An electrical circuit as claimed in claim 8 including means for quiescently biasing said negative resistance diode for bistable operation.

11. In combination, two branch circuits connected in parallel, one including the emitter-to-collector path of one transistor, and the other including the emitter-to-collector path of another transistor; connections for applying an operating current to said two branch circuits; and negative resistance means in at least one of said branch circuits responsive to information pulses applied to said branch circuits for steering said operating current mainly into one or the other of said branch circuits in accordance with the number of said pulses received concurrently.

12. In combination, a plurality of branch circuits connected in parallel, one including the emitter-to-collector path of one transistor and the other including the emitter-to-collector path of another transistor; means for applying the same current pulses, in parallel, to said branch circuits; and negative resistance means in at least one of said branch circuits for steering said pulses mainly into one or the other of said paths in accordance with the number of said pulses received concurrently.

13. In combination, two branch circuits connected in parallel, one including the emitter-to-collector path of one transistor, and the other including the emitter-to-collector path of another transistor; means for applying an operating current to said two circuits; means for applying the same information pulses, in parallel, to said two branch circuits; and negative resistance means in at least one of said circuits, including one negative resistance element connected in series with the emitter-to-collector path of one transistor and one negative resistance element connected in series with the emitter-to-collector path of said one transistor, responsive to information pulses applied to said branches for steering said operating current mainly into one or the other of said branches in accordance with the number of said pulses received concurrently.

14. In combination, two branch circuits connected in parallel, one including the emitter-to-collector path of a first transistor and the other including the emitter-to-collector path of a second transistor; means for applying current pulses to said branch circuits; a negative resistance element in said one branch circuit in series with the emitter-to-collector path of said first transistor; a by-pass circuit connected to said one branch circuit for steering the current passing into said one branch circuit into said first transistor when said negative resistance element is in one of its stable states; and means connecting the emitter-to-base diode of said second transistor across said negative resistance element for substantially forward biasing said second transistor when said negative resistance element is in the other of its stable states.

15. In combination, two branch circuits connected in parallel, the first including the emitter-to-collector path of a first transistor, and the second including the emitter-to-collector path of a second transistor; connections for applying an operating current to said two circuits; negative resistance means in said first circuit including one voltage-controlled negative resistance element in series in the forward direction with the emitter-to-collector path of said first transistor, and a second voltage-controlled negative resistance element connected in the forward direction between a point in said first circuit ahead of said transistor and a point of reference potential; and means connecting the emitter-to-base diode of said second transistor across said first negative resistance element in a sense to forward bias said emitter-to-base diode.

16. In combination, two branch circuits connected in parallel, one including the emitter-to-collector path of a first transistor the base of which is connected to a point of reference potential, and the other including the emitter-to-collector path of a second transistor; a common input terminal to both circuits; a voltage controlled negative resistance element in said one branch circuit in series, in the forward direction, with the emitter-to-collector path of said first transistor; a by-pass circuit connected between said input terminal and said point of reference potential for steering the current passing into said one branch circuit into said first transistor when said negative resistance element is in one of its stable states; and means connecting the emitter-to-base diode of said second transistor across said negative resistance element in a sense substantially to forward bias said second transistor when said negative resistance element is in the other of its stable states.

17. In the combination as set forth in claim 16, said by-pass circuit comprising a second voltage controlled negative resistance element.

18. In combination, two branch circuits connected in parallel, one including the emitter-to-collector path of a first transistor the base of which is connected to a point of reference potential, and the other including the emitter-to-collector path of a second transistor; a voltage controlled negative resistance element in said one branch circuit in series, in the forward direction, with the emitter-to-collector path of said first transistor; a by-pass circuit connected between the connection of said negative resistance element to said first transistor, and said point of reference potential for steering the current passing into said one branch circuit into said first transistor when said negative resistance element is in one of its stable states; and means connecting the emitter-to-base diode of said second transistor across said negative resistance element in a sense substantially to forward bias said second transistor when said negative resistance element is in the other of its stable states.

19. In the combination as set forth in claim 18, said by-pass circuit comprising a second voltage controlled negative resistance element of lower current peak than the series connected negative resistance element.

20. In combination, two branch circuits connected in parallel, the first including the emitter-to-collector path of a first transistor the base of which is connected to ground, and the second including the emitter-to-collector path of a second tarnsistor; a first tunnel diode in the first circuit connected in the forward direction in series with the emitter-to-collector path of the first transistor;

a second tunnel diode connected in the forward direction between said first circuit and ground; and means connecting the emitter-to-base diode of the second transistor across the first tunnel diode in a sense such that the voltage across said first tunnel diode forward biases said second transistor.

21. In combination, two branch circuits connected in parallel, the first including the emitter-to-collector path of a first transistor the base of which is connected to ground, and the second including the emitter-to-collector path of a second transistor; a tunnel diode in the first circuit connected in the forward direction in series with the emitter-to-collector path of the first transistor; a second tunnel diode of lower current peak than the first tunnel diode connected in the forward direction between the connection of the first tunnel diode to said first transistor, and ground; and means connecting the emitter-to-base diode of the second transistor across the first tunnel diode in a sense such that the voltage across said first tunnel diode forward biases said second transistor.

22. In combination, two branch circuits connected in parallel, the first including the emitter-to-collector path of a first transistor the base of which is connected to ground, and the second including the emitter-to-collector path of the second transistor; a tunnel diode in the first circuit connected in the forward direction in series with the emitter-to-collector path of the first transistor; a second tunnel diode connected in the forward direction between a point in the first circuit ahead of the transistor and ground; means connecting the emitter-to-base diode of the second transistor across the first tunnel diode in a sense such that the voltage across said first tunnel diode forward biases said second transistor; and means for applying current to the first circuit which, when at one level, causes both tunnel diodes to be in the low voltage state and, when at another level, causes the second tunnel diode to switch to the low current region of its high voltage state and the first tunnel diode to be in the high current region of its low voltage state and, which when at a third level, causes the first tunnel diode to switch to the low current region of its high voltage state and the second tunnel diode to be in its low voltage state.

23. In combination, two branch circuits connected in parallel, the first including the emitter-to-collector path of a first transistor the base of which is connected to ground, and the second including the emitter-to-collector path of a second transistor; a first tunnel diode in the first circuit connected at one electrode in the forward direction in series with the emitter-to-collector path of the first transistor; a second tunnel diode connected in the forward direction between the other electrode of said first tunnel diode and ground; and means connecting the emitter-to-base diode of the second transistor across the first tunnel diode in a sense such that the voltage across said first tunnel diode forward biases said second transistor.

24. In the combination as set forth in claim 23, said second tunnel diode having a higher valley voltage than said first tunnel diode.

25. The combination as set forth in claim 23, in which said second tunnel diode is a gallium arsenide tunnel diode and said first tunnel diode is a germanium tunnel diode.

26. In combination, two branch circuits connected in parallel, one including the emitter-to-collector path of one transistor, and the other including the emitter-to-collector path of another transistor; connections for applying an operating current to the two branch circuits; connections coupled to the emitters of both transistors for applying information pulses in parallel to said two branch circuits; and negative resistance means in at least one of said branch circuits responsive to said information pulses applied to said branch circuits for steering said operating current mainly into one or the other of said branch circuits in accordance with the number of information pulses received concurrently.

27. In combination, two branch circuits connected in parallel, one including the emitter-to-collector path of one transistor, and the other including the emitter-to-collector path of another transistor; connections for applying an operating current to said two branch circuits; and tunnel diode means in at least one of said branch circuits responsive to information pulses applied in parallel to said branch circuits for steering said operating current mainly into one or the other of said branch circuits in accordance with the number of said pulses received concurrently.

28. In combination, two branch circuits connected in parallel, one including the emitter-to-collector path of one transistor, the other including, in series, a device which, at one relatively low value of voltage across the device, passes a relatively high value of current and at a second, higher value of voltage across the device passes a substantially smaller value of current and the emitter-to-collector path of a second transistor, and means for supplying operating current for both of said transistors to said two branch circuits.

29. In combination, two branch circuits connected in parallel, one including the emitter-to-collector path of one transistor, the other including, in series, a tunnel diode connected in the forward direction with the emitter-to-collector path of a second transistor, the tunnel diode being connected to the emitter of the second transistor, a connection from the base of the first transistor to the emitter of the second transistor, and means for supplying operating current to both of said transistors.

30. In combination, two branch circuits connected in parallel, one including the emitter-to-collector path of one transistor, the other including, in series, a tunnel diode and the emitter-to-collector path of a second transistor, the tunnel diode being connected between the emitters of the two transistors and in the forward direction with respect to the second transistor; a direct connection between the base of the first transistor and the emitter of the second transistor; means for applying signal pulses to the common connection between the emitter of the first transistor and the tunnel diode; and means for supplying operating current to both of said transistors.

31. In combination, two branch circuits connected to a common input terminal, one including the emitter-to-collector path of one transistor, the other including a tunnel diode connected in the forward direction to the emitter-to-base diode of a second transistor, the tunnel diode being connected at one electrode to the emitter of the first transistor and at the other electrode to the emitter-to-base diode of the second transistor; a direct connection between the base of the first transistor and the emitter-to-base diode of the second transistor; means for applying signal pulses to said common input terminal, said terminal being directly connected to both the emitter of the first transistor and the tunnel diode; and means for applying operating current to both of said transistors.

32. In combination, a common input terminal; two branch circuits connected to said input terminal, one including the emitter-to-collector path of one transistor and the other including the emitter-to-base diode of a second transistor; means for applying current pulses to said input terminal; and negative resistance means in at least one of said branch circuits for steering said pulses mainly into one or the other of said branch circuits in accordance with the number of said pulses received concurrently.

33. In combination, a common input terminal; two branch circuits connected to said input terminal, one including the emitter-to-collector path of a first transistor and the other including the emitter-to-base diode of a second transistor; a direct connection between the base of the first transistor and the emitter-to-base diode of the second transistor; means for applying current pulses to said input terminal; and negative resistance means in at least one of said branch circuits for steering said pulses mainly into one or the other of said branch circuits in accordance with the number of said pulses received concurrently.

34. In combination, a common input terminal; two branch circuits connected to said input terminal, one including the emitter-to-collector path of one transistor and the other including the emitter-to-base diode of a second transistor; means for applying current pulses to said input terminal; and a tunnel diode in the second branch circuit connected in the forward direction to the emitter-to-base diode of the second transistor and connected in parallel with the emitter-to-base diode of the first transistor for steering said pulses mainly into one or the other of said branch circuits in accordance with the number of said pulses received concurrently.

35. In combination, a common input terminal; two branch circuits connected to said input terminal, one including the emitter-to-collector path of one transistor and the other including the emitter-to-base diode of a second transistor; means for applying current pulses to said input terminal; a tunnel diode connected to the input terminal at one electrode and both to the emitter-to-base diode of second transistor and the base of the first transistor at its other electrode for steering said pulses mainly into one or the other of said branch circuits in accordance with the number of said pulses received concurrently; and another diode connected in parallel with the emitter-to-base diode of the second transistor.

References Cited by the Examiner

UNITED STATES PATENTS 3,094,630 6/1963 Rapp et al. ---------- 307—88.5

ARTHUR GAUSS, *Primary Examiner.*

J. ZAZWORSKY, *Assistant Examiner.*